US008478569B2

(12) United States Patent
Scarpelli et al.

(10) Patent No.: US 8,478,569 B2
(45) Date of Patent: Jul. 2, 2013

(54) AUTO ADJUSTMENT OF BASELINE ON CONFIGURATION CHANGE

(75) Inventors: Joseph A. Scarpelli, Mountain View, CA (US); Alex Lefaive, Sunnyvale, CA (US); Derek Dang, San Jose, CA (US); Sridhar Sodem, Cupertino, CA (US)

(73) Assignee: BMC Software, Inc., Houston, TX (US)

( * ) Notice: Subject to any disclaimer, the term of this patent is extended or adjusted under 35 U.S.C. 154(b) by 288 days.

(21) Appl. No.: 12/872,871

(22) Filed: Aug. 31, 2010

(65) Prior Publication Data

US 2011/0238377 A1 Sep. 29, 2011

Related U.S. Application Data

(60) Provisional application No. 61/318,137, filed on Mar. 26, 2010.

(51) Int. Cl.
*G06F 17/18* (2006.01)

(52) U.S. Cl.
USPC ........... 702/186; 702/182; 709/206; 709/223; 714/47.1; 714/47.2; 714/47.3

(58) Field of Classification Search
USPC .......................................................... 702/186
See application file for complete search history.

(56) References Cited

U.S. PATENT DOCUMENTS 5,506,955 A * 4/1996 Chen et al. ...................... 714/26
6,306,088 B1 * 10/2001 Krausman et al. ............ 600/301
6,327,677 B1 12/2001 Garg et al.
6,453,265 B1 9/2002 Dekhil et al.
6,816,898 B1 * 11/2004 Garg et al. .................... 709/224
7,131,037 B1 10/2006 Lefaive et al.
7,350,209 B2 * 3/2008 Shum ............................ 718/104
2003/0061130 A1 * 3/2003 Hoffman et al. ................ 705/30
2003/0139905 A1 7/2003 Helsper et al.
2004/0088400 A1 5/2004 Daggett
2007/0005297 A1 1/2007 Beresniewicz et al.
2008/0270071 A1 10/2008 Marvasti et al.
2009/0063390 A1 3/2009 Marvasti
2010/0020909 A1 * 1/2010 Jung et al. ..................... 375/371
2010/0086933 A1 * 4/2010 Hospach et al. .................. 435/6
2011/0161048 A1 * 6/2011 Sodem et al. ................. 702/181
2011/0238376 A1 * 9/2011 Dang et al. .................... 702/186
2011/0238377 A1 * 9/2011 Scarpelli et al. .............. 702/186
2011/0246585 A1 * 10/2011 Scarpelli et al. .............. 709/206

OTHER PUBLICATIONS

U.S. Appl. No. 12/750,347 Non-Final Office Action mailed Apr. 2, 2012, 30 pages.
U.S. Appl. No. 12/750,347 Final Office Action mailed Jul. 27, 2012, 21 pages.
Bouhana, et al., "Active Baselining in Passive Data Environments", Fujitsu Austrailia and New Zealand, (2006).
U.S. Appl. No. 12/750,347 Advisory Action mailed Nov. 5, 2012, 3 pages.

* cited by examiner

*Primary Examiner* — Jonathan C Teixeira Moffat
*Assistant Examiner* — Stephanie Chang

(57) ABSTRACT

A baseline adjusting technique allows automatically adjust the baselines of metrics affected by a configuration change a monitored system. If a configuration change is detected, a performance management system retrieves linkages between the changed configuration parameter and one or more metrics. The performance management system then adjusts the baselines of the metric using the baseline adjusting algorithm retrieved from the linkage.

20 Claims, 6 Drawing Sheets

500

START

510 DETECT A CHANGE IN A CONFIGURATION PARAMETER

520 IDENTIFY ONE OR MORE LINKAGES BETWEEN THE CHANGED CONFIGURATION PARAMETER AND METRICS

530 RETRIEVE A BASELINE FOR EACH METRIC IDENTIFIED

540 IDENTIFY A BASELINE ADJUSTING ALGORITHM FOR EACH METRIC

550 ADJUST BASELINE BY APPLYING THE BASELINE ADJUSTING ALGORITHM

END

AUTO ADJUSTMENT OF BASELINE ON CONFIGURATION CHANGE

CROSS-REFERENCE TO RELATED APPLICATIONS

This Application claims priority to U.S. Provisional Application Ser. No. 61/318,137 entitled "Auto Adjustment of Baseline on Configuration Change" filed Mar. 26, 2010, which is hereby incorporated by reference in its entirety. This application is also related to U.S. patent application Ser. No. 12/750,347, entitled "Method to Optimize Prediction of Threshold Violations Using Baselines," filed Mar. 30, 2010 and which is hereby incorporated by reference.

BACKGROUND

This disclosure relates generally to the field of computer systems. More particularly, but not by way of limitation, it relates to a technique for improving performance monitoring systems.

In a performance monitoring system, a baseline is generally used to compare a metric's current behavior to past normal behavior in order to detect abnormal behavior. A metric's current behavior is considered abnormal if it is outside the normal range defined by the baseline.

Often a configuration change is necessary for an information technology system. A change in configuration may potentially cause a change in behavior in the system which may result in a performance problem. When a configuration change occurs, if a metric goes outside its baseline, an abnormality event is generally generated to alert the system administrator. Some configuration changes may cause other metrics to behave differently as well. However, these behavior changes may not be due to any real change in behavior of the system or the application being monitored. In some circumstances, false positive alerts may be generated in these metrics. In other circumstances, real problems may be obscured and no alert is generated.

Thus, it would be beneficial to provide a mechanism to capture the real problem caused by the configuration change and eliminate the false alarms.

SUMMARY

Various embodiments provide a mechanism to automatically adjust the baseline of one or more metrics in an information technology system resulting from a configuration change.

In one embodiment, a method is disclosed to automatically adjust at least one metric's baseline when there is a configuration change. The method comprises detecting a change in a configuration parameter; identifying at least one linkage between the changed configuration parameter and at least one metric of the computer system; and adjusting a baseline for at least one metric based on at least one baseline adjusting algorithm.

In another embodiment, a performance management system is disclosed. The performance management system comprises a processor; an operator display, coupled to the processor; a storage subsystem, coupled to the processor; and a software, stored in the storage subsystem, comprising instructions that when executed by the processor cause the processor to perform the method described above.

In yet another embodiment, a non-transitory computer readable medium is disclosed. The non-transitory computer readable medium has instructions for a programmable control device stored thereon wherein the instructions cause the programmable control device to perform the method described above.

In yet another embodiment, a networked computer system is disclosed. The networked computer system comprises a plurality of computers communicatively coupled, at least one of the plurality of computers programmed to perform at least a portion of the method described above wherein the entire method described above is performed collectively by the plurality of computers.

DETAILED DESCRIPTION

Figure 1:
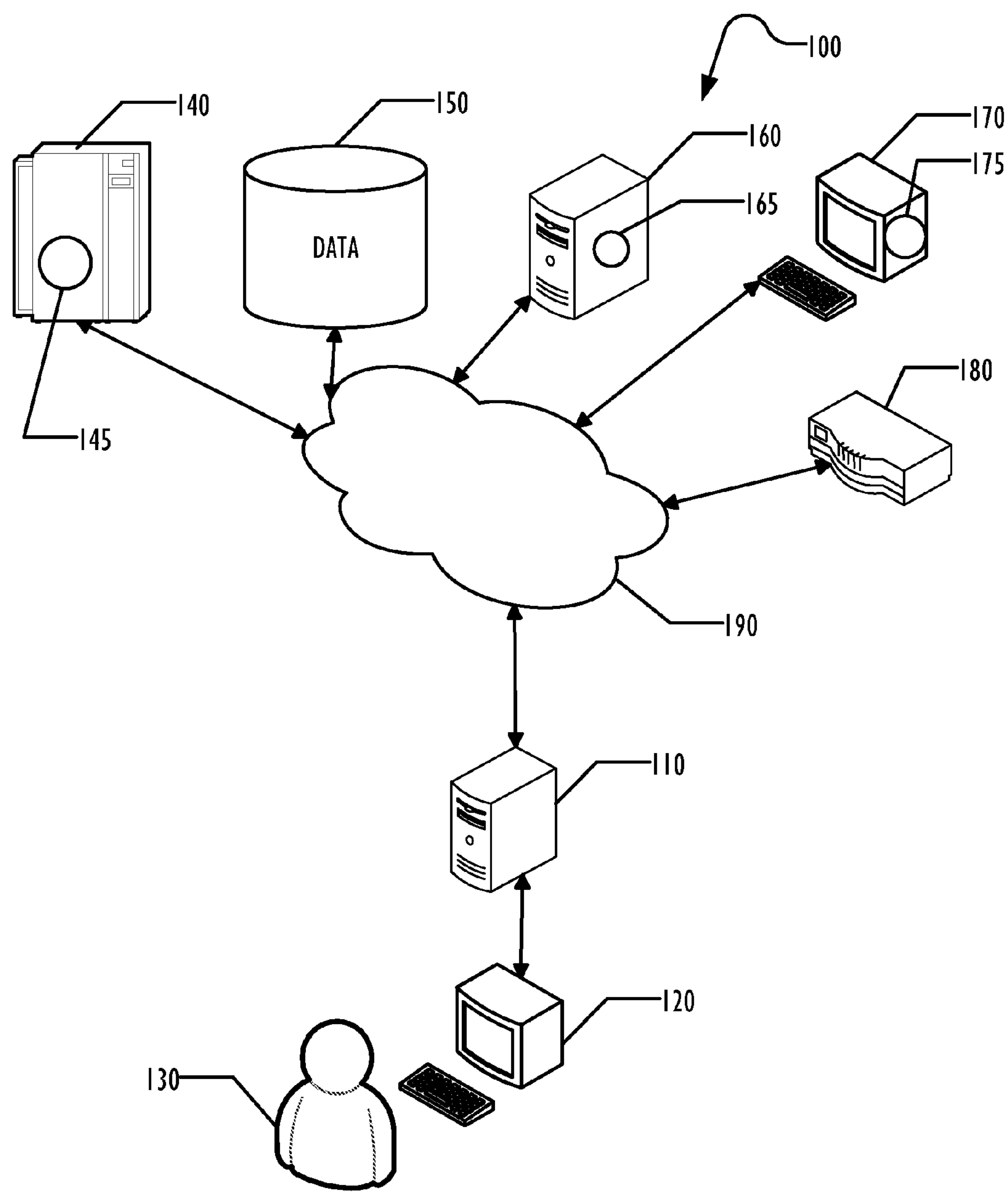
FIG. 1 illustrates, in block diagram form, an example IT infrastructure monitored using a technique for automatically adjusting baselines according to one embodiment.

Various embodiments provide a mechanism to automatically adjust one or more metric baselines in an information technology (IT) system based on a change in a configuration parameter. Illustrative configuration parameters include, but are not limited to: the number of CPUs, the amount of system memory, disk capacity, etc. The IT system may be either a physical system or a virtual system. According to one embodiment, a performance management system determines whether there is a change in the monitored system's configuration parameters. If a change is detected, the performance management system next determines from a knowledgebase whether there exists a linkage between the changed configuration parameter and one or more system metrics. Illustrative linkages include, but not limited to: metric "CPU utilization" is linked to configuration parameter "the number of CPUs", metric "memory free" is linked to configuration parameter "the amount of system memory", etc. In one embodiment, an expert system provides a knowledgebase populated with linkages between configuration parameters and system metrics. Each linkage ties a configuration parameter to one or more system metrics and can include a baseline adjusting algorithm for one or more system metrics. Where a "baseline adjusting algorithm" defines an algorithm for adjusting the baseline of the corresponding metric. If a linkage is found to exist, the system retrieves a baseline adjusting algorithm provided in the linkage and adjusts the metric's baseline using the baseline adjusting algorithm. Automatic adjustment of baselines captures the change in the metric's behavior caused by the configuration change and eliminates possible false alarms.

In the following description, for purposes of explanation, numerous specific details are set forth in order to provide a thorough understanding of the invention. It will be apparent to one skilled in the art, however, that the invention may be practiced without these specific details. In other instances, structure and devices are shown in block diagram form in order to avoid obscuring the invention. It will be appreciated that in the development of any actual implementation (as in any development project), numerous decisions must be made to achieve the developers' specific goals (e.g., compliance with system- and business-related constraints), and that these goals will vary from one implementation to another. It will also be appreciated that such development effort might be complex and time-consuming, but would nevertheless be a routine undertaking for those of ordinary skill in the art having the benefit of this disclosure. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

FIG. 1 is a block diagram illustrating example IT system 100 that employs performance monitoring in accordance with techniques described herein. An application executing in computer 110 may collect and monitor performance data from a number of IT system elements, including mainframe 140 and application 145 running thereon, data storage system 150 such as a storage area network, server 160 and application 165 running thereon, workstation 170 and application 175 running thereon, and router 180. As shown, system 100 uses network 190 for communication of monitoring data to monitoring computer 110. In some embodiments, however, some or all of the monitored devices may be directly connected to monitoring computer 110. These system elements are illustrative and by way of example only, and other system elements may be monitored. For example, instead of being standalone elements as illustrated in FIG. 1, some or all of the elements of IT system 100 monitored by the computer 110, as well as the computer 110, may be rack-mounted equipment. Although illustrated in FIG. 1 as a single computer 110, multiple computers may provide the performance monitoring functionality herein. Finally, while network 190 is represented as a single entity it may, in fact, comprise a number of different networks.

In some embodiments, operator 130 uses workstation 120 for viewing displays generated by monitoring computer 110, and for providing functionality for operator 130 to take corrective actions when an alarm is triggered. In some embodiments, operator 130 may use computer 110, instead of separate workstation 120.

Figure 2:
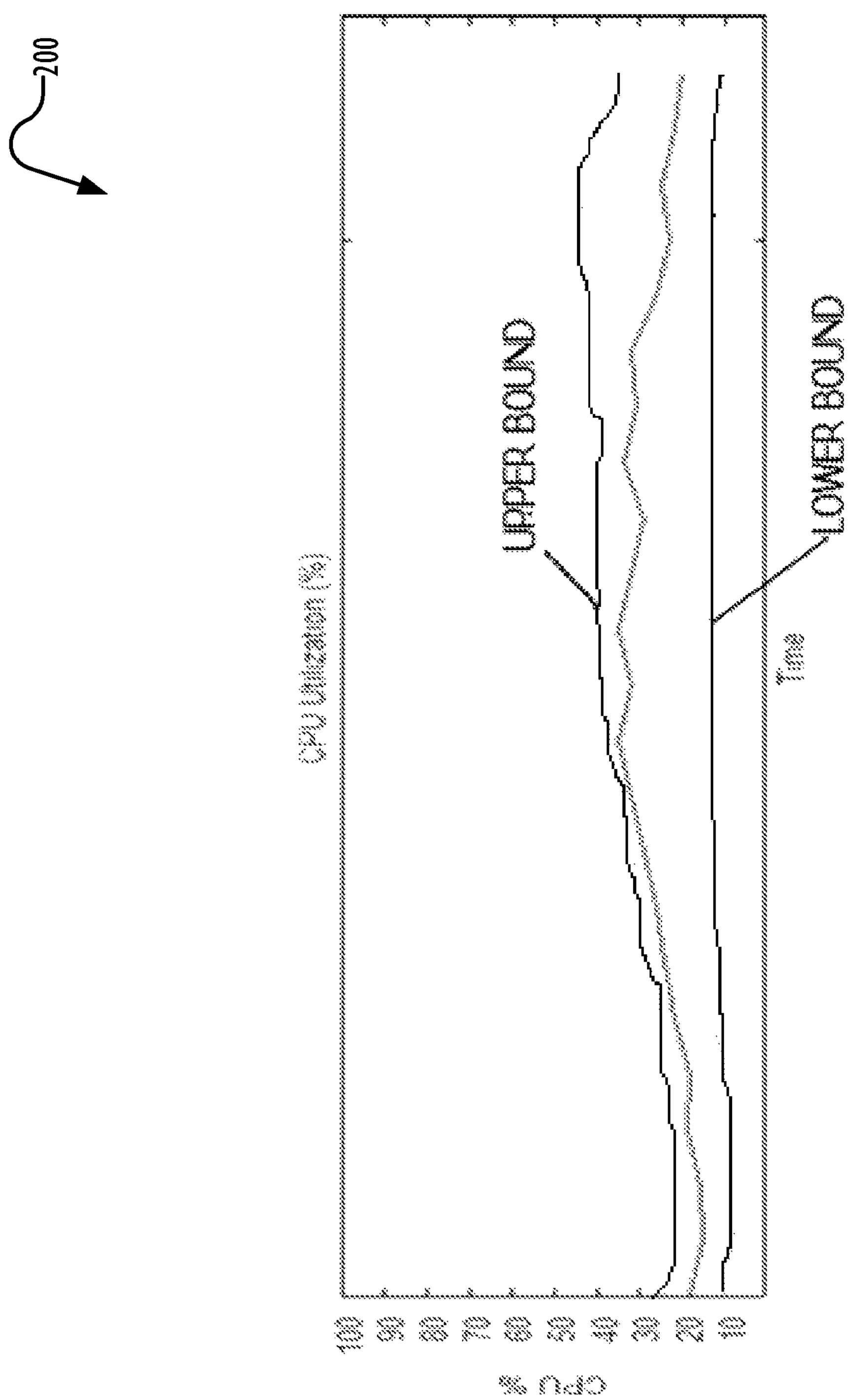
FIG. 2 illustrates, in graph form, an example baseline used to monitor a system metric.

A baseline is generally defined as the range of normal behavior for a system or application metric with a lower bound and an upper bound. Illustrative metrics include, but are not limited to, CPU utilization, memory free (MB), etc. According to one embodiment, the lower and upper bounds of a baseline are defined as the 5% and 95% percentile lines based on the metric's operating range for a specified time period (e.g., one day, one week or one month). Often times, the resolution of the baseline may not match the resolution of the metric's data points. For example, the metric data may be collected at 1 minute intervals, while the baseline is calculated every hour. The baseline may be continuously reshaped by factoring in the current data. The exact formula used to recalculate the baseline will determine how quickly it adjusts based on the metric's movements. FIG. 2 is an example baseline for one instance of a processing unit or CPU utilization metric. A metric's current behavior is generally considered abnormal if it is outside the normal range defined by the baseline's upper and lower bounds.

System configuration changes may occur frequently. Some configuration changes may be necessary and planned by an administrator, such as adding or removing a new CPU to the system. Other changes may occur inadvertently, such as when a CPU stops working. Sometimes, a change in a configuration parameter may cause a change in system behavior. When a configuration change occurs, if a metric goes outside its baseline, the performance management system will generate an alert for an abnormality event. If the service/application experiences significant performance degradation, these abnormal metrics can help pinpoint the problem. Some configuration changes may also cause other metrics to behave differently. Changes in behavior of these metrics may not be due to any real change in the behavior of the system or the application being monitored.

In one embodiment, a performance management system monitors resource metrics which are scaled based on a configuration parameter, such as CPU, memory, disk, etc. For example, metrics "% memory free", "% memory available", and "% memory used" are scaled based on the amount of memory in the system. However, if the amount of memory increases (decreases), these %-memory metrics will record proportionally lower (higher) values, even if there is no real change in the system's behavior. Such a change in the metric's measured performance could lead to a system alert.

In another embodiment, a virtual machine (VM) is moved from one physical host to another. Even if the application running on the VM behaves the same as before the move, some metrics (usually system metrics monitoring the virtual resources) can behave differently, especially, if the new host does not have the same configuration as the old host.

In yet another embodiment, an existing system is repurposed, e.g., an application is uninstalled and a new application is deployed; or the system was idle, and now it is added into a server pool for an application. Either situation can result in a metric straying from its "pre-change" baseline.

There are two kinds of problems that can result from the metric values collected post-configuration change being compared to a baseline which was shaped based on pre-configuration change data.

Figure 3A:
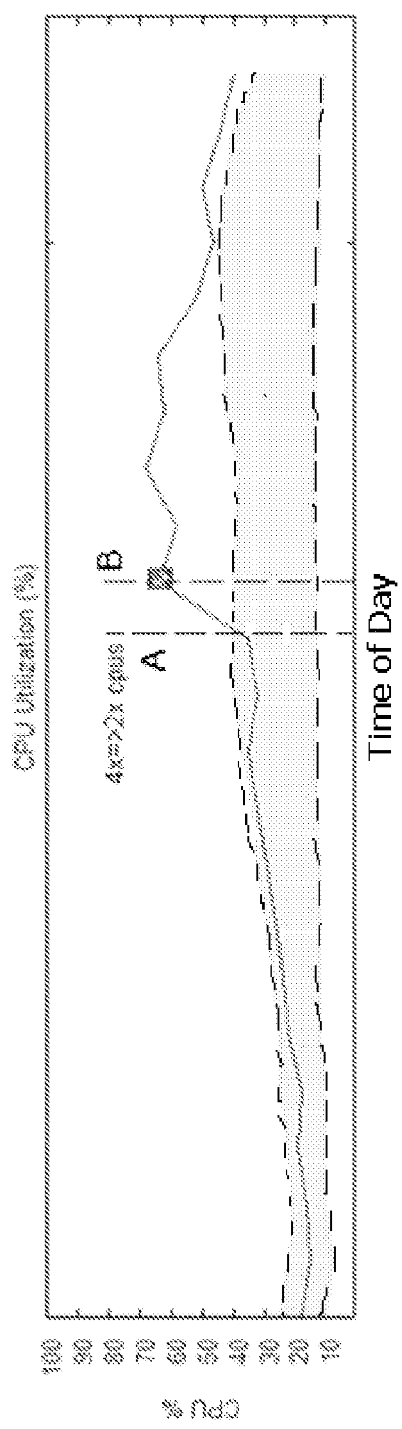
FIG. 3 illustrates, in graph form, an example of a baseline adjustment graph according to one embodiment.

(1) False positives alerts. FIG. 3A illustrates one exemplary false alarm situation. As shown in FIG. 3A, prior to a change in the number of CPUs, an illustrative virtual machine's total system CPU utilization averages around 25%, and the baseline ranges from approximately 10% to approximately 40% (depending on the hour of the day). At time A the number of virtual CPUs is reduced from four to two. The reduction of the number of CPUs causes the measured CPU utilization to double. As a result, the measured CPU utilization jumps to over 50%. Since the established baseline is based on the past behavior when there were four CPUs, the performance management system would flag the CPU utilization as abnormal because the metric goes outside its baseline. As shown in FIG. 3A, the metric is flagged as having an abnormality at point B.

Figure 4A:
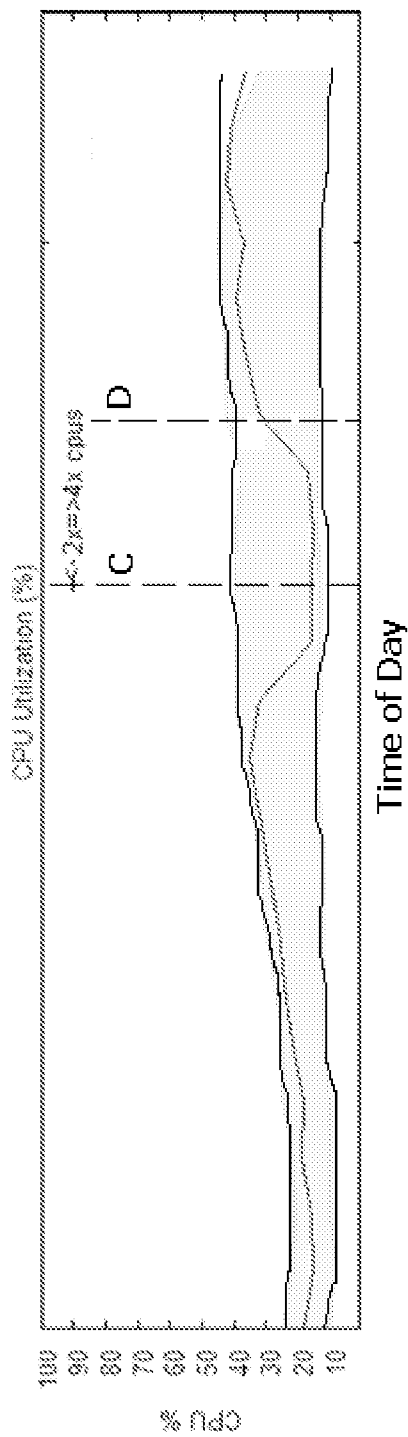
FIG. 4 illustrates, in graph form, another example of a baseline adjustment graph according to one embodiment.

(2) Obscuring real changes. FIG. 4A illustrates one exemplary situation where real changes are obscured. As shown in FIG. 4A, a virtual machine having two CPUs was running around 25% CPU utilization with a baseline that ranged between approximately 10% and approximately 40%. At point C, the number of CPUs is increased from two to four. This increase in the number of CPUs causes the CPU utilization to drop from around 25% to around 12.5%. Since the baseline is based on past behavior when there were only two CPUs, the baseline would remain between 10% and 40%, when it should have been halved to approximately 5% and 20% due to the doubling of CPUs. As shown in FIG. 4A, the CPU utilization initially falls to the bottom of the baseline after the configuration change, but then a few hours later at point D, a surge in CPU usage is detected. The surge is still considered normal behavior by the performance management system because it is still within the metric's baseline.

Figure 3B:
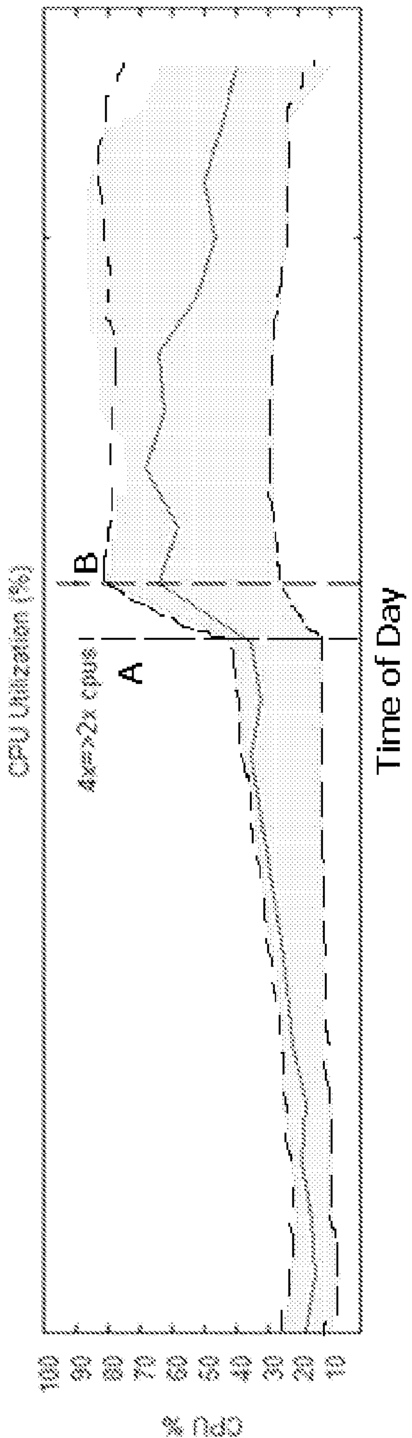
Figure 4B:
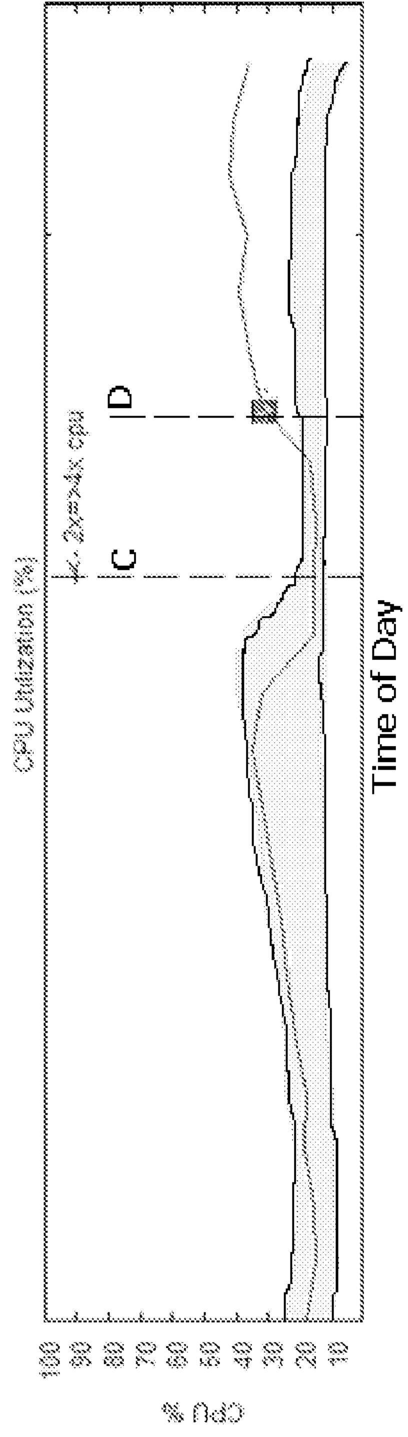

According to one embodiment, at the time the configuration change occurs, metrics linked to that configuration parameter may have their baselines rescaled based on the old and new values of the configuration parameter. Adjustment of the baseline may eliminate the problem of metric data values collected after the configuration change being out-of-sync with the baseline which was shaped before the configuration change. Referring now to FIG. 3B, the system has the number of CPUs changed from four to two at time A just as in FIG. 3A. As shown in FIG. 3B, however, the baseline for CPU total utilization % is rescaled proportionally higher to compensate for the decreased number of CPUs. After adjustment of the baseline, the false positive seen in FIG. 3A is eliminated. Also as shown in FIG. 4B, the system has the number of CPUs changed from two to four at time C just as in FIG. 4A. As in FIG. 3B, the baseline is rescaled proportionally lower to compensate for the increase in the number of CPUs. After adjustment of the baseline, the performance management system is capable of detecting an abnormal behavior at point D that happens several hours later, unlike before in FIG. 4A. Accordingly, real problems that occur after the configuration change are now captured.

According to another embodiment, the baselines for all metrics may temporarily adapt faster to the current metric behavior. For example, when a virtual machine is moved to another physical host, the change in behavior usually cannot be defined by a simple mathematic formula. Some metrics will behave the same, but some may behave differently. One embodiment of the invention temporarily speeds up the learning of the behavior on the new host by folding in the current metric behavior into the metric's baseline at a faster rate.

Figure 5:
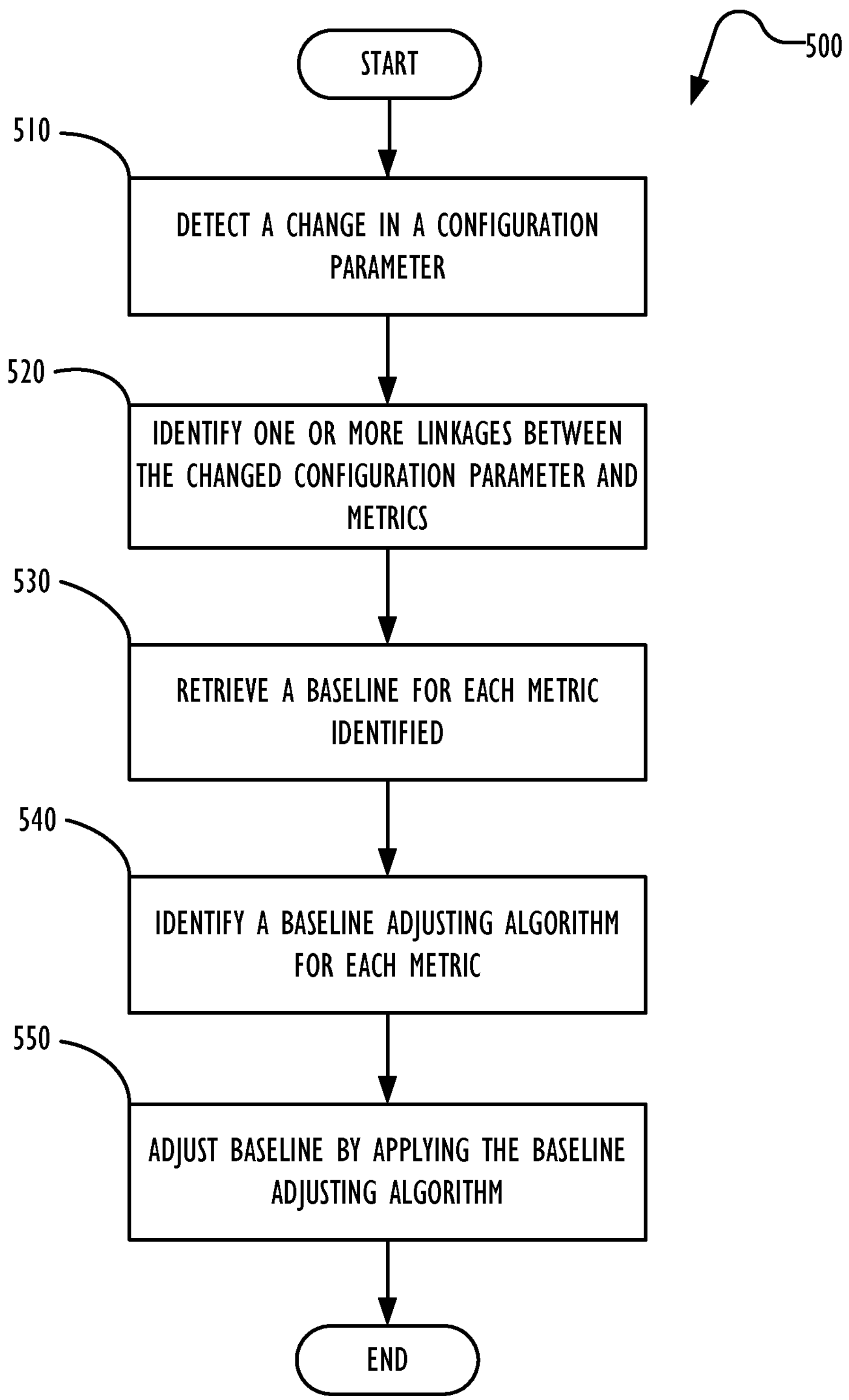
FIG. 5 illustrates, in flowchart form, a technique for automatically adjusting baselines according to one embodiment.

Referring now to FIG. 5, one embodiment of a method for automatically adjusting baselines to a metric due to a configuration change is illustrated. The process 500 is typically initiated when a performance management system detects a change in one or more configuration parameters, step 510. In one embodiment, the performance management system performs the functionality of detecting a configuration change itself. In another embodiment, a software application (Agent) may be setup and running to detect a configuration change.

In step 520, the performance management system identifies whether there is a linkage between the changed configuration parameter and the system's metrics. According to one embodiment, an expert system provides a knowledgebase populated with linkages between configuration parameters and metrics. The linkage information may be sourced directly from the data collection metadata which self-describes the relationships between the configuration parameters and metrics. A system developer may also provide the linkage information during the development stage of the performance management system. Each linkage specifies a baseline adjusting algorithm to be used to adjust the metric's baseline based on the old and new values of the configuration parameter. In one embodiment, there are several types of predefined baseline adjusting algorithms. By way of example, predefined baseline adjusting algorithms include these types:

- RESCALE_BASELINE. This type of baseline adjusting algorithm comprises a mathematical formula. The performance management system recalculates the new baseline for the metric based on the mathematical formula provided in the linkage. One exemplary RESCALE_BASELINE formula is: new baseline value=old baseline value*(old configuration parameter value/new configuration parameter value).
- ADAPT_BASELINE. In this type of baseline adjusting algorithm, the performance management system will temporarily speed up calculating a metric's baseline if the configuration parameter's metric linkage has a baseline adjusting algorithm of ADAPT_BASELINE. For example, if the performance management system calculates a metric's baseline every hour before a configuration change, after the configuration change, the baseline may be recalculated every 5 minutes in the next six hours.
- RESET_BASELINE. In this type of baseline adjusting algorithm, the performance management system will discard baseline values collected before the configuration change, and calculate the baseline using only the data collected after the configuration change.
- Other baseline adjusting algorithm may include custom formulas, e.g., the baseline for free memory (in MB) may be recalculated by shifting it higher (lower) based on the increase (decrease) in the maximum memory.

Table 1 illustrates some example linkages between configuration parameters and metrics. As shown in Table 1, a change in a configuration parameter could impact one or more system metrics. The performance management system identifies all existing linkages between each changed configuration parameter and the various system metrics.

TABLE 1

Example Configuration Parameter - Metric Linkages

| Configuration Parameter | Linked Metric | Baseline Adjusting Algorithm |
|---|---|---|
| Number of CPUs | CPU Utilization (%) | New CPU % Baseline = Old CPU % Baseline * (Old Number of CPUs/New Number of CPUs) |
| System Memory | Memory Free (%) | New Memory Free % Baseline = Old Baseline * (Old System Memory/New System Memory) |
| System Memory | Memory Free (MB) | New Memory Free Baseline (MB) = Old Baseline + (New System Memory − Old System Memory) |
| Virtual System's Physical Host | * (All Metrics) | ADAPT_BASELINE (see above) |

In one embodiment, there exist multiple linkages between a changed configuration parameter and a system metric in the knowledgebase, each linkage has a baseline adjusting algorithm. In another embodiment, multiple metrics use one baseline adjusting algorithm.

In step 530, the performance management system retrieves the baseline for each of the metrics identified in step 520. In step 540, the performance management system retrieves a baseline adjusting algorithm for each of the metric baselines retrieved in step 530. As shown in Table 1, each linkage in Table 1 has a baseline adjusting algorithm corresponding to the linked metric. In step 550, the performance management system adjusts the baseline by applying the baseline adjusting algorithm retrieved in step 540.

In one embodiment, the baseline adjusting algorithm retrieved is a mathematical formula. The performance management system adjusts the metric's baseline by applying the identified formula. For example, as shown in FIG. 3B, the new baseline is calculated using the formula:

New CPU % Baseline=Old CPU % Baseline*(Old # of CPUs−New # of CPUs).

As a result, the adjusted baseline in the situation where the number of CPUs was reduced from four to two, is rescaled higher than the original baseline. Similarly, as shown in FIG. 4B, where the number of CPUs changed from two to four, the adjusted baseline is rescaled lower to compensate the increase of CPUs.

In another embodiment, the baseline adjusting algorithm retrieved is ADAPT_BASELINE. According to this embodiment, the performance management system will temporarily increase the speed at which the baseline is reshaped to reflect the metric's current behavior. For example, the metric data may be collected at 1 minute intervals, while the baseline may be calculated at 1 hour intervals. After receiving the baseline and the baseline adjusting algorithm (which is ADAPT_BASELINE in this case), the performance management system may recalculate the baseline every 5 minutes instead of every hour. Because of the increased update rate, more current data are taken into account when calculating the baseline.

In yet another embodiment, the baseline adjusting algorithm is in some form of custom formulas developed by a user, such as, the system administrator of the performance management system. The performance management system adjusts the baseline using the baseline adjusting algorithm. By way of example, in a situation where more memory is added to the system, the baseline for metric "Memory Free (MB)" may be adjusted using a custom formula:

New Memory Free Baseline (MB)=Old Baseline+(New System Memory−Old System Memory).

The adjusted baseline shifts higher to reflect the increase of system memory. Other forms of custom formulas may also be used. In one embodiment, the system allows an administrator of a performance management system to change the baseline adjusting algorithm for each metric.

In still another embodiment, the baseline adjusting algorithm retrieved is RESET_BASELINE. According to this embodiment, the performance management system will reset the baseline. The old baseline values before the configuration change will be discarded. The performance management system recalculates the baseline using only the data collected after the configuration change.

In general, only the metric's baseline for the future is adjusted. The historic data of the metric's baseline prior to the configuration change is not modified.

Figure 6:
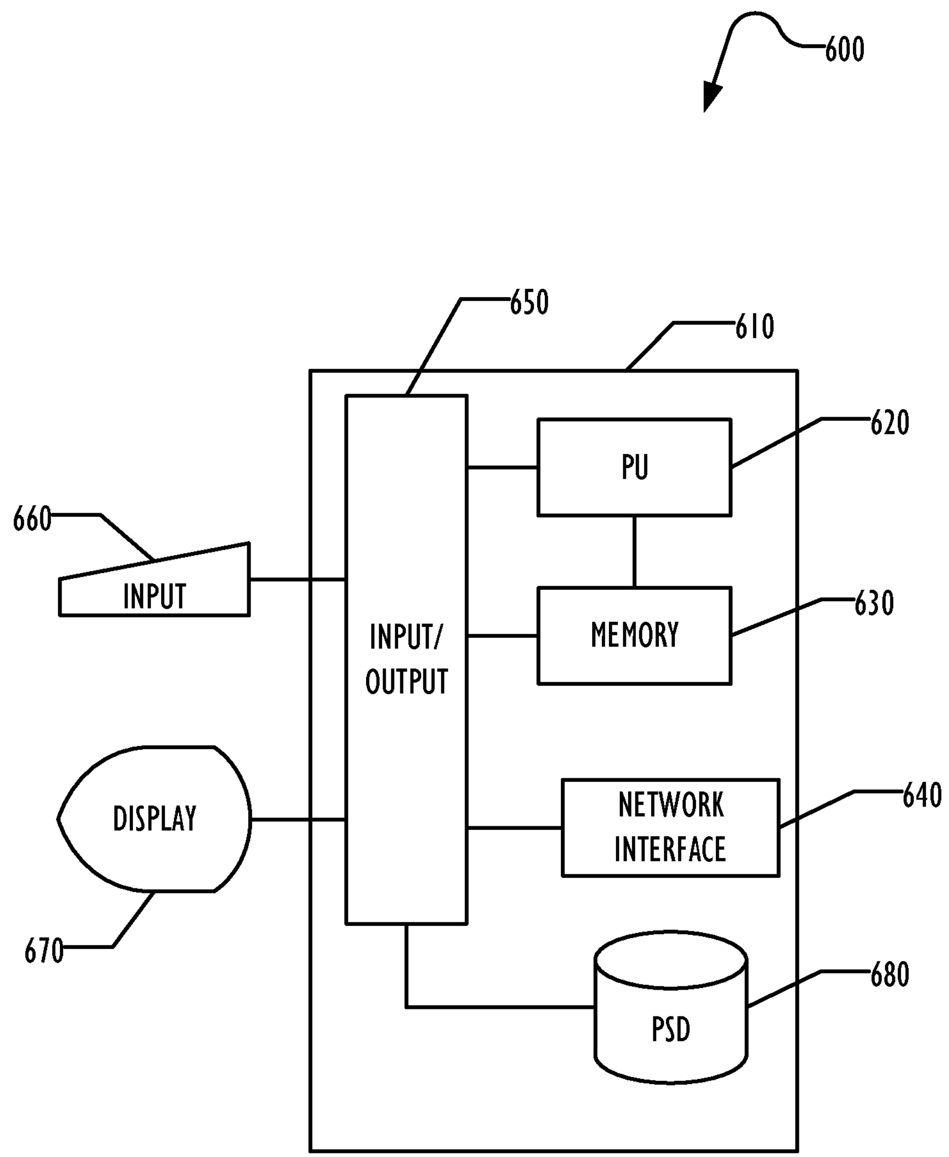
FIG. 6 illustrates, in block diagram form, an example computer system used for performing a technique for automatically adjusting baselines according to one embodiment.

Referring now to FIG. 6, example computer 600 for use in adjusting metric baselines is illustrated in block diagram form. Example computer 600 comprises system unit 610 which may be optionally connected to an input device or system 660 (e.g., keyboard, mouse, touch screen, etc.) and display 670. Program storage device (PSD) 680 is included with system unit 610. Also included with system unit 610 is network interface 640 for communication via a network with other computing and corporate infrastructure devices (not shown). Network interface 640 may be included within system unit 610 or be external to system unit 610. In either case, system unit 610 may be communicatively coupled to network interface 640. Program storage device 680 represents any form of non-volatile storage including, but not limited to, all forms of optical and magnetic storage, including solid-state, storage elements and removable media. Program storage device 680 may be used for storage of software to control system unit 610 in, data for use by the computer 600, or both.

System unit 610 may be programmed to perform methods in accordance with this disclosure (an example of which is shown in FIG. 5). System unit 610 comprises processor unit (PU) 620, input-output (I/O) interface 650 and memory 630. Processing unit 620 may include any programmable controller device including, for example, one or more members of the Intel Atom®, Core®, Pentium® and Celeron® processor families from the Intel, Sun SPARC® processor families from Sun and the Cortex and ARM processor families from ARM. (INTEL, INTEL ATOM, CORE, PENTIUM, and CELERON are registered trademarks of the Intel Corporation. CORTEX is a registered trademark of the ARM Limited Corporation. ARM is a registered trademark of the ARM Limited Company. SPARC is a registered trademark of the SPARC International, Inc.) Memory 630 may include one or more memory modules and comprise random access memory (RAM), read only memory (ROM), programmable read only memory (PROM), programmable read-write memory, and solid-state memory. One of ordinary skill in the art will also recognize that PU 620 may also include some internal memory including, for example, cache memory.

Various changes in the components as well as in the details of the illustrated operational method are possible without departing from the scope of the following claims. For instance, the illustrative system of FIG. 6 may be comprised of more than one computer communicatively coupled via a communication network, wherein the computers may be mainframe computers, minicomputers, workstations or any combination of these. Further, monitored applications may execute on multiple hardware platforms. Such a network may be composed of one or more local area networks, one or more wide area networks, or a combination of local and wide-area networks. In addition, the networks may employ any desired communication protocol and further may be "wired" or "wireless." In addition, acts in accordance with FIG. 5 may be performed by a programmable control device executing instructions organized into one or more program modules. A programmable control device may be a single computer processor, a special purpose processor (e.g., a digital signal processor, "DSP"), a plurality of processors coupled by a communications link or a custom designed state machine. Custom designed state machines may be embodied in a hardware device such as an integrated circuit including, but not limited to, application specific integrated circuits ("ASICs") or field programmable gate array ("FPGAs"). Storage devices suitable for tangibly embodying program instructions include, but are not limited to: magnetic disks (fixed, floppy, and removable) and tape; optical media such as CD-ROMs and digital video disks ("DVDs"); and semiconductor memory devices such as Electrically Programmable Read-Only Memory ("EPROM"), Electrically Erasable Programmable Read-Only Memory ("EEPROM"), Programmable Gate Arrays and flash devices.

It is to be understood that the above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

What is claimed is:

1. A method for monitoring performance of an information technology system, the method comprising:

detecting a change in a configuration parameter in a computer system;

identifying at least one linkage between the changed configuration parameter and at least one metric of the computer system, wherein each of the at least one linkage comprise a baseline rescaling formula that accounts for the change in the configuration parameter; and at the time of detecting the change in the configuration parameter, rescaling a baseline for the at least one metric based on the baseline rescaling formula.

2. The method of claim 1, wherein the act of identifying at least one linkage between the changed configuration parameter and at least one metric of the computer system comprises identifying at least one linkage corresponding to the detected change in the configuration parameter from a set of linkages between configuration parameters and metrics, wherein the set of linkages between configuration parameters and metrics are stored in a knowledgebase.

3. The method of claim 2, wherein the set of linkages between configuration parameters and metrics are sourced from a set of data collection meta data.

4. The method of claim 2, wherein the set of linkages between configuration parameters and metrics are pre-configured.

5. The method of claim 1, wherein the rescaling formula includes calculating the baseline by dividing an existing configuration parameter value by a new configuration parameter value to obtain a value, and multiplying the value by an existing baseline value.

6. The method of claim 5, wherein the configuration parameters include a number of CPUs associated with the computer system.

7. The method of claim 1, further comprising:

discarding baseline values prior to the detected change in the configuration parameter; and recalculating the baseline using data collected after the detected change in the configuration parameter.

8. The method of claim 1, further comprising: increasing baseline calculation speed.

9. The method of claim 1, wherein the act of detecting a change in a configuration parameter comprises receiving, from an agent, a list of changed configuration parameters.

10. A programmable storage device having programmed instructions stored thereon for causing a programmable control device to perform a method according to claim 1.

11. A method for monitoring performance of an information technology system, the method comprising:

receiving a change in a configuration parameter in a computer system;

identifying at least one linkage between the changed configuration parameter and at least one metric of the computer system, wherein each of the at least one linkage comprise a baseline rescaling formula that accounts for the change in the configuration parameter;

retrieving a baseline corresponding to each of the at least one metric;

identifying at least one baseline rescaling formula, from the identified at least one linkage, for the each of the at least one metric; and at the time of detecting the change in the configuration parameter, rescaling the baseline using the at least one baseline rescaling formula.

12. The method of claim 11, wherein the act of identifying at least one linkage between the changed configuration parameter and at least one metric of the computer system comprises identifying at least one linkage corresponding to the detected change in the configuration parameter from a set of linkages between configuration parameters and metrics, wherein the set of linkages between configuration parameters and metrics are stored in a knowledgebase.

13. The method of claim 12, wherein the set of linkages between configuration parameters and metrics are sourced from a set of data collection meta data.

14. The method of claim 12, wherein the set of linkages between configuration parameters and metrics are pre-configured.

15. The method of claim 11, wherein the act of adjusting the baseline using the at least one baseline rescaling formula comprises recalculating the baseline by applying one of the at least one baseline rescaling formula, wherein the one of the at least one baseline rescaling formula is a mathematical formula that includes dividing an existing configuration parameter value by a new configuration parameter value to obtain a value, and multiplying the value by an existing baseline value.

16. The method of claim 11, wherein the act of rescaling the baseline comprises:

discarding baseline values prior to the detected change in the configuration parameter; and recalculating the baseline using data collected after the detected change in the configuration parameter.

17. The method of claim 11, wherein the act of rescaling the baseline comprises increasing baseline calculation speed.

18. A programmable storage device having programmed instructions stored thereon for causing a programmable control device to perform a method according to claim 11.

19. A performance monitoring system, comprising:

a processor;

an operator display, coupled to the processor;

a storage subsystem, coupled to the processor; and a software, stored by the storage subsystem, comprising instructions that when executed by the processor cause the processor to perform the method of claim 1.

20. A networked computer system comprising:

a plurality of computers communicatively coupled, at least one of the plurality of computers programmed to perform at least a portion of the method of claim 1 wherein the entire method of claim 1 is performed collectively by the plurality of computers.

* * * * *